United States Patent [19]

Wadin et al.

[11] Patent Number: 5,491,739
[45] Date of Patent: Feb. 13, 1996

[54] METHODS OF ESTABLISHING A TWO-WAY CALL IN A RADIO COMMUNICATION SYSTEM

[75] Inventors: Craig P. Wadin, Sunrise; Paul D. Marko, Ft. Lauderdale, both of Fla.

[73] Assignee: Motorola, Inc., Schaumburg, Ill.

[21] Appl. No.: 205,455

[22] Filed: Mar. 4, 1994

[51] Int. Cl.⁶ .................................................. H04M 11/00
[52] U.S. Cl. .................. 379/57; 379/58; 379/61
[58] Field of Search .................................. 379/57, 58, 59, 379/61, 63; 455/33.1

[56] References Cited

U.S. PATENT DOCUMENTS

| | | | |
|---|---|---|---|
| 5,090,051 | 2/1992 | Muppidi et al. | 379/61 |
| 5,151,930 | 9/1992 | Hagl | 379/57 |
| 5,307,399 | 4/1994 | Dai et al. | 379/57 |

FOREIGN PATENT DOCUMENTS

| | | | |
|---|---|---|---|
| 2243746 | 11/1991 | United Kingdom | 379/57 |

OTHER PUBLICATIONS

Modular Voice Processing System (MVP™) brochure, Glenayre Electronics, 1991.
Modular Voice Processing–Entry System (MVP-E™) General and Technical Specifications brochure, Glenayre Electronics, 1991.
Modular Voice Processing (MVP™), Family Cellular Application Features brochure, Glenayre Electronics, 1991.
Modular Voice Processing–Entry System (MVP-E™) Overview/General Description brochure, Glenayre Electronics, 1991.
Modular Voice Processing System (MVP™) Overview/General Description brochure, Glenayre Electronics Ltd., 1991.
Modular Voice Processing System (MVP™) General and Technical Specifications brochure, Glenayre Electronics, 1991.
Modular Voice Processing (MVP™) Family Central Office Application Features brochure, Glenayre Electronics, 1991.
Modular Voice Processing (MVP™) Family Standalone Application Features brochure, Glenayre Electronics, 1991.
Modular Voice Processing (MVP™) Family Message Delivery Features brochure, Glenayre, 1991.
Modular Voice Processing (MVP™) Family Bulletin Board Features brochure, Glenayre Electronics, 1991.
Modular Voice Processing (MVP™) Family Call Routing/Automated Attendant Features brochure, Glenayre Electronics, 1991.
Modular Voice Processing (MVP™) System Family Dispatch Feature brochure, Glenayre Electronics, 1991.

*Primary Examiner*—Curtis Kuntz
*Assistant Examiner*—G. J. Oehling
*Attorney, Agent, or Firm*—Donald C. Kordich

[57] ABSTRACT

A method for providing two-way calling between first and second handsets (402, 404) using a base station (406) and a paging terminal (412). The method for making the call includes storing a base line phone number for each line within the base station (406). A communication link is established between the first handset (402) and the base station (406) and between the base station (406) and the paging terminal (412). The paging terminal (412) prompts the caller for information to be sent to the second handset and the caller responds by entering a sequence that allows the base station itself to forward the base line phone number and an alias code, representing the identification of the first handset, to the paging terminal (412). The paging terminal (412) then pages the second handset (404) with the base line phone number and the alias code. Any communciations device may return the call by calling the base line phone number and entering the alias code, thus establishing a communications link with the first handset (402).

6 Claims, 5 Drawing Sheets

5,491,739

METHODS OF ESTABLISHING A TWO-WAY CALL IN A RADIO COMMUNICATION SYSTEM

TECHNICAL FIELD

This invention relates to radio communication systems, and more specifically to two-way calling methods in radio communication systems.

BACKGROUND

A communication system which enables communication link establishment between two Second Generation Cordless Telephones (CT-2) having pagers is the Glenayre MODULAR VOICE PROCESSING™ system (MVP™) manufactured by Glenayre Technologies, Inc. A calling party dials an MVP access number and the MVP responds by sending a prompt requesting the caller to enter the phone number and record their name. The caller is put on hold and may continue to hold or leave a message. The subscriber is notified of the call waiting and dials an MVP access number and enters a password. The MVP announces the call and the routing options available to the subscriber. The subscriber can choose to connect the call, continue to hold the call, or transfer the call.

A CT-2 Telepoint system using the MVP system is shown in FIG. 1. A call between a first handset having a pager 102, which will be referred to as the calling party, and a second handset with pager 104, which will be referred to as the subscriber, are processed through the MVP system 112. Calling party 102 establishes a communication link with a first base station 106 and dials in an access number. This access number will route the calling party 102 through the Public System Telephone Network (PSTN) 110 to the MVP system 112. Calling party 102 then enters the phone number for the handset 104 in response to a prompt sent by the MVP 112. The MVP system assigns a telephone line number based on the line the call came in on and looks up the pager number associated with the phone number that was entered. The MVP system 112 generates a page and sends the assigned telephone line number reserved for connection to the subscriber 104 using a paging terminal 116. The paging terminal 116 pages the second handset 104 with the assigned telephone line number while the calling party 102 is placed on hold for a predetermined time during the interconnect process. If the predetermined time elapses without interconnect, the MVP system 112 indicates to the calling party 102 that the subscriber 104 is not available and to leave a voice message, or try to call again later.

The subscriber 104, upon receipt of the page, also has a predetermined time period to respond to the page and be connected. The subscriber's page indicates a call is holding. By entering an MVP access code and choosing to connect the call, the subscriber 104 is linked to a second base station 108, which calls back the assigned telephone line number. The call connection is made from the second base station 108 through an interconnect to the PSTN 110 and from the PSTN through an interconnect to the MVP 112. The MVP system 112 then interconnects the returned subscriber call to the holding calling party 102 through the first base station 106.

There are several disadvantages to the MVP system. A system operator assigns the subscriber a personal telephone number for the MVP system service and a second number for stand-alone paging service. This requires the calling party 102 to remember two numbers depending on which service is desired, two-way calling or paging. A system that would allow the calling party to use one number would be easier to use.

When the call is connected, the call is routed from handset 102 to the base station 106, through the PSTN 110 to the MVP system 112, then back through the PSTN and second base station 108, to subscriber 104. This requires four hardwire interconnects in order to establish the communication link between the first and second handsets. The first interconnect goes from the base station 106 to the PSTN 110, the second interconnect from the PSTN to the MVP system 112, the third from the second base station 108 to the PSTN and the fourth from the PSTN to the MVP system.

Another disadvantage to the MVP system 112 is the additional external hardware needed for connection between the MVP and the paging terminal 116. A system that would not require additional peripheral equipment would make installation of the system less expensive and easier to set up.

System capacity to support the number of subscribers is limited to the number of available ports in the MVP system 112. The MVP 112 is a modular design, therefore expansion requires the addition of trunk cards to increase system ports and overall system capacity.

Call holding is a programmable feature that must be used with caution due to its impact on system capacity. Excessive call holding time by the calling party 102, as experienced in the MVP system, substantially reduces system capacity since that line is reserved until it is released.

Hence, there is a need for a system that would provide two-way calling that would alleviate the problems of installation and cost associated with providing new hardware. An improved system with regards to system expansion and capacity would also be a benefit to the system manufacturer.

DETAILED DESCRIPTION OF THE PREFERRED EMBODIMENT

Figure 2:
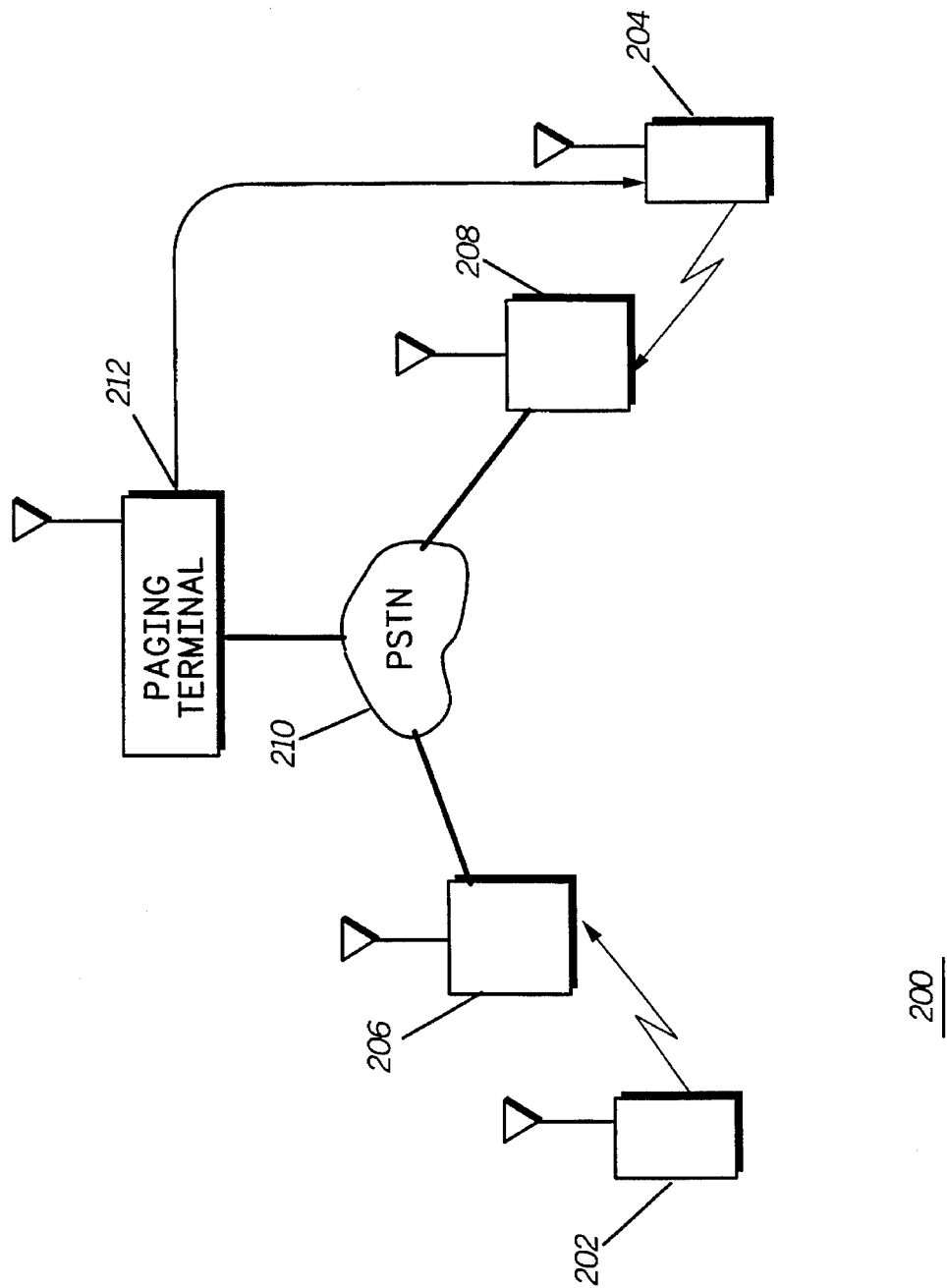
FIG. 2 is a block diagram of a first embodiment of a two-way calling system in accordance with the present invention.

In FIG. 2, a radio system 200 in accordance with the invention is shown. A detailed discussion of CT-2 systems can be found in two standards documents, the Common Air Interface (CAI) published by The European Telecommunications Standards Institute (ETSI) Version 1.1 Jun. 30, 1991 and MPT 1375 Common Air Interface Specification, May 1989, published by the Department of Trade and Industry, London, which are hereby incorporated by reference.

In a first embodiment of the invention, the CT-2 radio system 200 comprises a base station 206 which stores a base line telephone number for at least one and preferably each line within the base station connected to a PSTN 210. The system is further comprised of a calling party 202, which in the preferred embodiment is a first subscriber handset, and a second party 204, preferably a second subscriber handset having a pager.

In order to establish a two-way call between the first and second handsets 202, 204, the calling party 202 establishes a link to the base station 206 and enters a paging service code, such as a seven digit paging service telephone number. The base station 206 then routes the paging service code through the PSTN 210. The PSTN 210 routes the paging service code to a paging terminal 212 which in turns sends out a request, or prompt, to the calling party 202 to enter the pager number of the party to be paged. Once the pager number has been entered, the paging terminal 212 will send out a prompt message to the first handset 202 requesting the phone number to be sent to the pager. The calling party 202 then enters a sequence in response to the received prompt, which causes the base station 206 to send the base line telephone number of the line in use from the base to the paging terminal 212. The paging terminal 212 then pages the second handset 204 with the base line telephone number. Meanwhile, the base station 206 puts the first handset 202 on hold and also puts the line in use on hook (a condition in which a call can be received) for a predetermined time in order to allow an incoming call from the second handset 204.

The second party 204 receives the page and the user enters the number received which is the base line telephone number. The second handset 204 then establishes a link with a second base station 208, and the base line telephone number is routed from the second base station to the PSTN 210. The PSTN 210 then rings, or accesses, the reserved base line telephone number at the first base station 206. The first base station 206 goes off hook (a busy or in use condition) in response to the accessing of the base line and the call is connected. The call is terminated without connection when either the predetermined time has passed or the first handset 202 hangs up, terminating the link.

Note that with the system as described by the invention, when the communication link is established, the call is routed from the calling party 202, to the first base station 206, through the PSTN 210, to the second base station 208, and to the second handset 204. This requires only two hardwire interconnects to the PSTN 210, one from the first base station 206 and the other from the second base station 208. This is an advantage over the prior art system described in FIG. 1 which uses four interconnects to the PSTN 210.

Figure 1:
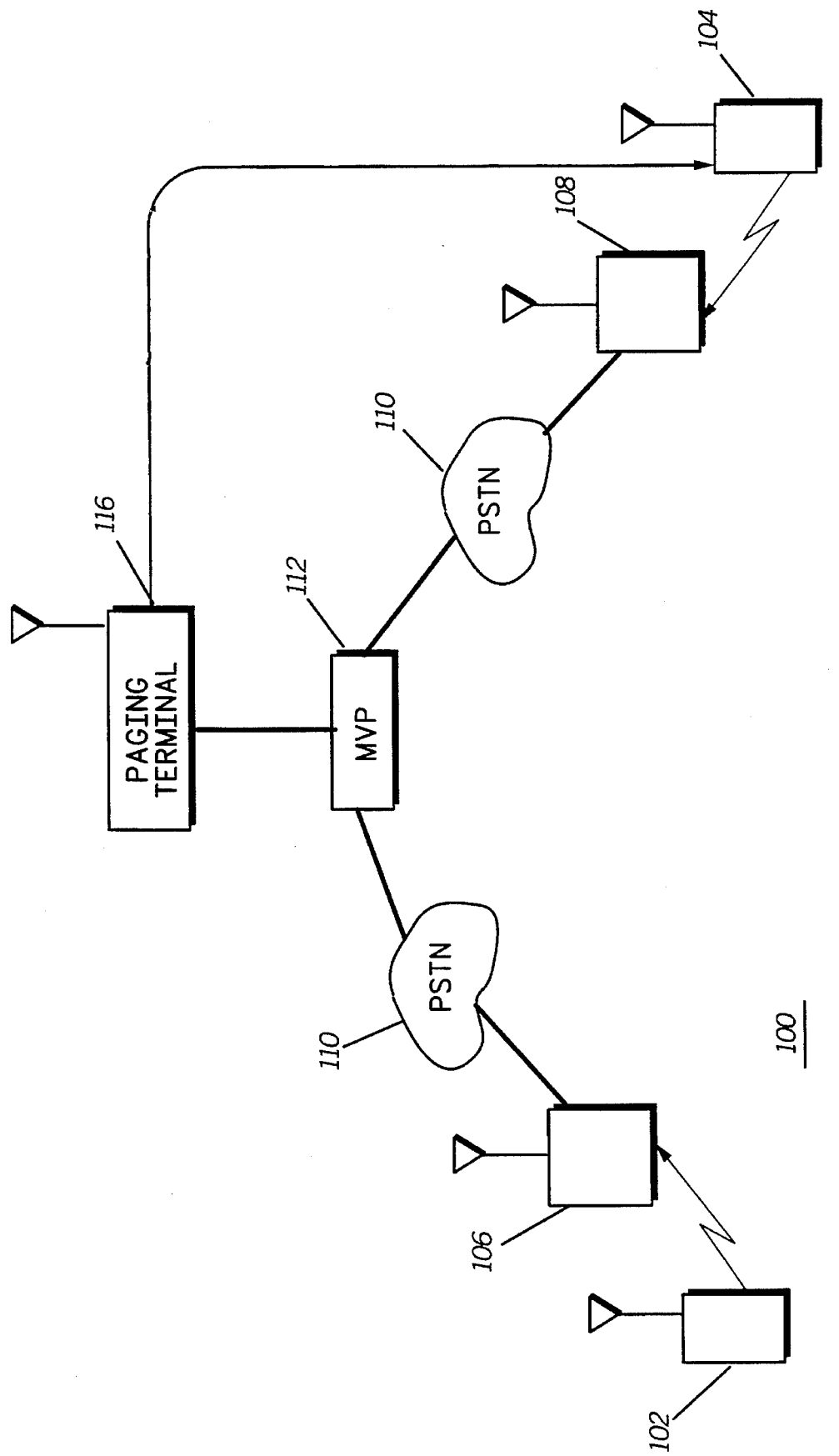
FIG. 1 is a block diagram of prior art for a two-way calling system using the prior art MVP system.

By connecting the call through the radio system 200 as described by the invention, the existing infrastructure is used without any additional hardware as compared to the system shown in FIG. 1, making the system 200 cost effective to implement. An existing CT-2 system can be upgraded to the system 200, preferably through changes in software at the base station. This allows for existing handset product already in the marketplace to make use of the system.

Any communication device can be used to return the call with the base line telephone number. Also note that the caller could send the page to a stand-alone pager, as opposed to a subscriber unit with pager, and the second party could return the call on any handset, such as a conventional telephone or mobile radio. If a conventional telephone were used to return the call, the second base station 208 would no longer be required.

Figure 3:
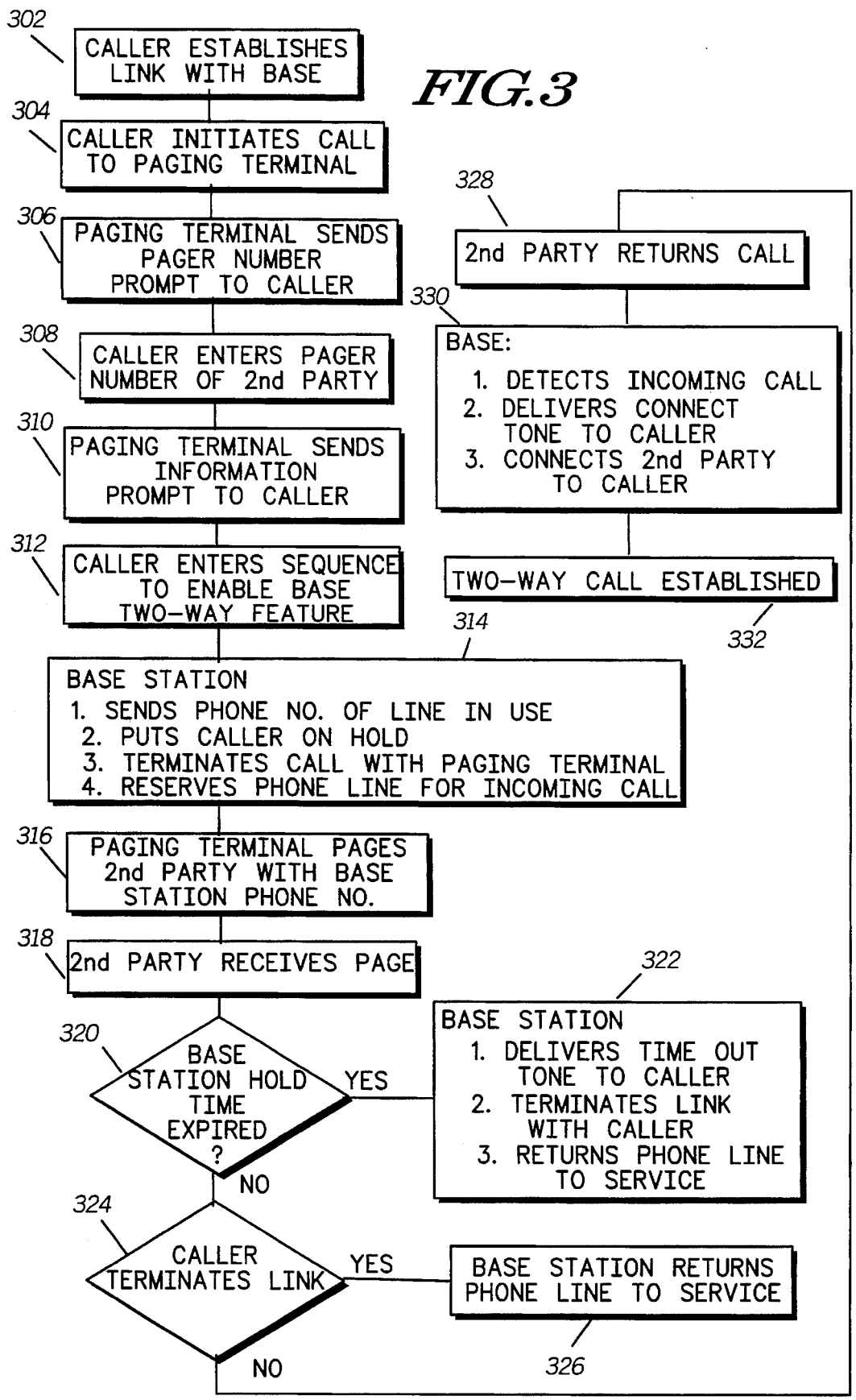
FIG. 3 is a flow chart of the operation of the two-way calling system of FIG. 2.

A flow chart of the of the communication link process is shown in FIG. 3. In order to make a call in a system 200 where base line telephone numbers are stored in the base 206, the sequence is begun by the caller establishing a link with a base station in step 302 and initiating a call to a paging terminal in step 304. In steps 306 and 308, the paging terminal sends the pager number prompt to the calling party, and the caller enters the pager number of the second party. The paging terminal then sends an information prompt to the caller as shown in step 310 requesting the phone number to be sent to the pager. The caller enters a sequence in step 312 in response to the information prompt to enable the base two-way calling feature. The base station then sends the base line phone number to the paging terminal, puts the caller on hold, terminates the call with the paging terminal, and reserves the phone line for the incoming call, as shown in step 314. In step 316, the paging terminal pages the second party with the base station phone number. While the second party receives the page in step 318, the base station waits for a predetermined hold time as shown in step 320. If the time has expired the base delivers a time out tone to the caller, terminates the link with the caller, and returns the phone line to service, as shown in step 322. If the caller decides to terminate the link then the base station returns the phone line to service in steps 324 and 326. When the second party returns the call in step 328, the base station detects the incoming call, delivers a connect tone to the caller, and connects the second party to the caller, as shown in step 330. The caller receives the call in step 332, and the communication link is established.

Figure 4:
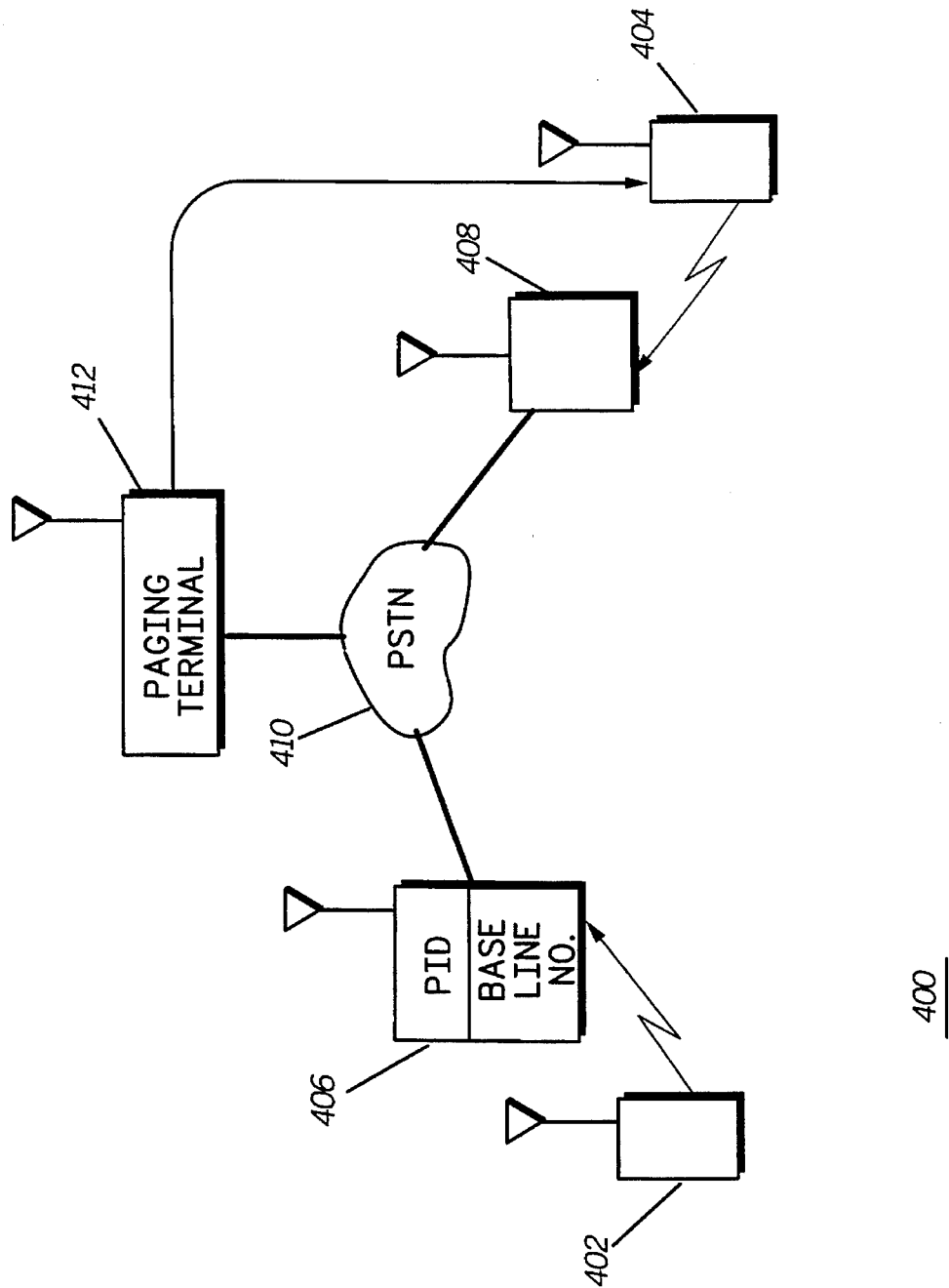
FIG. 4 is a block diagram of a second embodiment of a two-way calling system in accordance with the present invention.

In a second embodiment of the invention shown in FIG. 4, the first base station 406 stores a base line telephone number for each line within the base. The first handset with pager 402 establishes a link with the first base station 406 and enters a paging request code. The first base station 406 forwards the paging request code to a PSTN 410 which in turns sends the paging request to a paging terminal 412. Next, the paging terminal 412 sends out a request to the first handset 402 to enter the pager number of the party to be paged. The user enters the pager number of the second handset 404, and the paging terminal 412 then prompts the calling party 402 to enter the call back information to be sent to the second handset. A sequence is then entered at the first handset, and the first base station 406 assigns an alias code, such as a four digit number, to represent the handset portable identification number (PID) of the first handset 402, within the base. The sequence entered at the first handset also allows the first base station 406 to forward the base line telephone number and alias code to the pager terminal 412.

The paging terminal 412 then pages the second handset 404 with the base line telephone number and alias code while the link between the first handset 402 and first base station 406 is dropped or disestablished, thus freeing the handset to receive other calls while the base line is placed on hook. When the second handset 404 receives the page, the second party enters base line number and a link is established between the second handset 404 and a second base station 408. Once the link is established, the second base station 408 routes the base line phone number to the PSTN 410 where the PSTN will then ring, or access, the first base station 406.

When the first base 406 takes the line off hook in response to said accessing, the base sends a request for the alias code to the second handset 404. A link is then established between the first base station 406 and the first handset 402 using the stored PID number represented by the alias code. When the link is established the call is connected and the communication link is complete.

The second party may use a conventional telephone or other two-way radio, as opposed to the subscriber handset 404, to complete the communication link.

Figure 5:
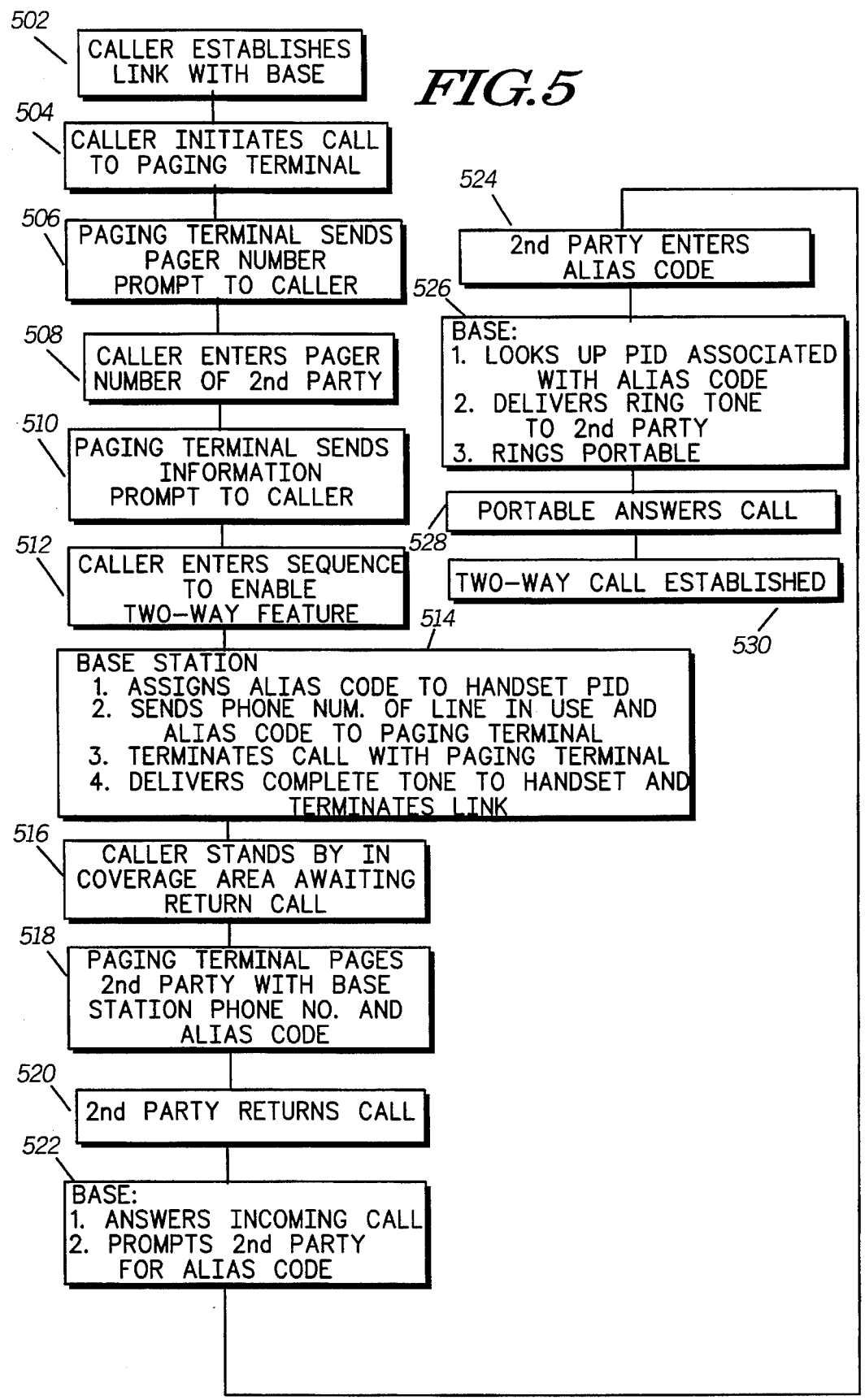
FIG. 5 is a flow chart of the operation of the two-way calling system of FIG. 4.

A flow chart, as shown in FIG. 5, shows the steps involved in order to make a call in a system where base line phone numbers and handset identification numbers are stored in the base. The caller establishes a link with the base station in step 502 and initiates a call to a paging terminal in step 504. In step 506, the paging terminal sends a pager number prompt to the caller. The caller then enters a pager number of a second party in step 508. The paging terminal sends an information prompt to the caller, and the caller enters a sequence to enable the two-way calling feature, as shown in steps 510 and 512. The base station responds to the sequence in step 514 by assigning an alias code to the handset portable identification number (PID) and sending the phone number of the line in use along with the alias code to the paging terminal, the base then terminates the call with the paging terminal, delivers a complete tone to the first handset, and terminates the link between the handset and the base. The caller awaits the return call in a coverage area, while the paging terminal pages the second party with the base station phone number and alias number as shown in steps 516 and 518 respectively. The second party then returns the call in step 520 in response to the page. The base station answers the call and prompts the second party for the alias code in step 522. The second party then enters the alias code in step 524, and the base responds by looking up the PID associated with the alias code, delivering a ring tone to the second party, and ringing the portable as shown in step 526. The portable answers the call in step 528, and the call is established between the caller and the second party in step 530.

Both embodiments of the invention use the existing infrastructure, preferably through software, without the added cost of the external MVP 112 system hardware. Only two hardwire interconnects to the PSTN 210 in system 200, or the PSTN 410 in system 400, are used when the communication link is established, as opposed to the four interconnects in the system 100 described in FIG. 1. The caller need only remember one number, the pager number, for use in both the two-way calling service and the stand-alone paging service, in the system as described by the invention, as opposed to the system 100 where the user is required to remember a MVP phone number and a separate pager number for stand alone paging service.

There is no requirement to add any extra hardware to increase capacity of the two-way calling system as described by the invention, since the system is preferably controlled by software within the base stations and follows the number of channels in the system as opposed to the MVP system which requires the addition of trunk cards.

In the second embodiment of the invention, the communication link between the first handset 402 and first base 406 is dropped while the page is being routed to the second handset 404. This method maintains the capacity of the system as opposed to a system which puts the handset on hold.

Other features could be added to further enhance the call back process such as programming the handsets with a dial-back feature so that the second party could return the call without having to enter any base line number or alias code. By entering a function code at the second handset in response to the page, the base line telephone number and/or alias code would be forwarded to the second base station.

Both of the embodiments of the invention could further incorporate a scrambling or encryption algorithm in the software at the first base station that would provide security for the system base line numbers and/or alias codes. In system 200, the base line telephone number of the line in use could be represented by an encrypted code and sent to the paging terminal 212 in response to the prompt message received at the first handset 202. The paging terminal 212 would then page the second party with the encrypted information, and the second party would respond by either entering a dial-back function code or entering the encrypted information at the second handset 204. The second base station 208 would then decode the encrypted data and return the call through the PSTN 210 to the reserved base line at the first base station 206. System 400 would similarly encode at the first base station 406 and decode at the second base station 408. An encrypted version of the base line telephone number would prevent the second party from gaining internal access to the base station software.

To those skilled in the art it can be seen that the invention is not so limited. The method could be applied to other communications systems to enable two-way calling, such as DECT, Digital European Cordless Telephone. Although the preferred embodiment describes the second handset with pager as the device for responding to the page, a stand-alone pager could be used to receive the page and a handset, such as a mobile radio or conventional telephone, could be used to respond to the page and complete the communication link. Hence, the system as described by the invention provides a method for establishing a communication link using existing infrastructure hardware at a reduced cost while keeping system capacity to a maximum.

What is claimed is:

1. A method of establishing a two-way call between a caller using a first cordless handset having an identification number and a second party having access to means for making telephone calls and a pager with a corresponding pager number, the two-way call being established over a system including a first base station with a two-way call feature and capable of wireless communication with the first cordless handset, a public switched telephone network coupled to the first base station through a plurality of lines, and a paging terminal coupled with the public switched telephone network and capable of paging the second party through the pager, the method comprising the steps of:

storing, in the first base station, a telephone number for each line;

establishing, by the caller using the first cordless handset, a first communication link between the first cordless handset and the first base station;

initiating, by the caller using the first cordless handset after establishing the first communication link, a paging service call with the paging terminal wherein a second communication link is established between the first base station and the paging terminal through the public switched telephone network, and wherein a line of the plurality of lines is used in establishing the second communication link;

entering, by the caller using the first cordless handset, a sequence which enables the two-way call feature;

assigning, by the first base station, an alias code representing the identification number of the first cordless handset;

sending, by the first base station to the paging terminal through the public switched telephone network in response to entering the sequence, data representing the telephone number of the line and the alias code;

terminating by the first base station, the first communication link;

transmitting, by the paging terminal after sending the data, to the second party a page including the data and the alias code; and initiating, by the second party after receiving the data and the alias code, a return call to the telephone number of the line by using the data;

establishing, through the public switched telephone network, a connection between the second party and the line of the first base station;

requesting of the second party, by the first base station, the alias code; and entering by the second party in response to the requesting the alias code, the alias code, and establishing, by the first base station, a connection between the first base station and the first cordless handset using the stored identification number represented by the alias code.

2. The method of establishing the two-way call of claim 1, wherein the data is the telephone number.

3. The method of establishing the two-way call of claim 1, further comprising the steps of:

encrypting, by the first base station before sending the data, the telephone number;

wherein the means for making telephone calls by the second party includes a second cordless handset and a second base station capable of wireless communication with the second cordless handset; and wherein the step of making a return call includes decoding, by the second base station, the encrypted data thus re-creating the telephone number.

4. The method of establishing the two-way call of claim 1, further comprising the steps of:

sending, by the paging terminal to the caller after establishing the second communication link, a pager number prompt;

entering, by the caller using the first cordless handset in response to the pager number prompt, the pager number;

sending, by the paging terminal to the caller prior to the caller entering the sequence enabling the two-way call feature, an information prompt.

5. The method of establishing the two-way call of claim 1, wherein:

the means for making telephone calls includes a dial-back feature; and the step of making the return call includes entering, by the second party using the dial-back feature, a dial-back function code.

6. The method of establishing the two-way call of claim 1, wherein the pager is a stand-alone pager.

* * * * *